(12) United States Patent
Lv (10) Patent No.: US 8,761,238 B2
(45) Date of Patent: Jun. 24, 2014

(54) METHOD AND APPARATUS FOR CORRECTING FREQUENCY OFFSET

(71) Applicant: Huawei Technologies Co., Ltd., Shenzhen (CN)

(72) Inventor: Rui Lv, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/896,020

(22) Filed: May 16, 2013

(65) Prior Publication Data

US 2013/0315293 A1 Nov. 28, 2013

Related U.S. Application Data

(63) Continuation of application No. PCT/CN2012/075936, filed on May 23, 2012.

(51) Int. Cl.
*H03H 7/30* (2006.01)

(52) U.S. Cl.
USPC .......................................................... 375/232

(58) Field of Classification Search
CPC ................................................. H04L 27/2657
USPC .......................................................... 375/232
See application file for complete search history.

(56) References Cited

U.S. PATENT DOCUMENTS

| | | | | |
|---|---|---|---|---|
| 7,545,891 B1 * | 6/2009 | Pare et al. | ...................... | 375/344 |
| 7,856,068 B1 * | 12/2010 | Tung et al. | ...................... | 375/267 |
| 2004/0156349 A1 | 8/2004 | Borisovich et al. | | |
| 2006/0285478 A1 | 12/2006 | Gaikwad et al. | | |
| 2007/0002981 A1 * | 1/2007 | Gaikwad et al. | .............. | 375/346 |
| 2007/0140212 A1 * | 6/2007 | Gaikwad et al. | .............. | 370/350 |
| 2008/0101495 A1 * | 5/2008 | Gaikwad | ........................ | 375/267 |
| 2008/0101496 A1 | 5/2008 | Gaikwad et al. | | |
| 2008/0101497 A1 * | 5/2008 | Gaikwad et al. | .............. | 375/267 |

FOREIGN PATENT DOCUMENTS

CN 1520669 A 8/2004

OTHER PUBLICATIONS

International Search Report issued in corresponding PCT Patent Application No. PCT/CN2012/075936, mailed Mar. 7, 2013.
Tang et al., "A Space-Time Receiver With Joint Synchronization and Interference Cancellation in Asynchronous MIMO-OFDM Systems" IEEE Transactions on Vehicular Technology, vol. 57, No. 5, Sep. 2008, 15 pages.
Zhang et al., "Layered Frequency-Domain Equalization for Single Carrier MIMO Systems with Multiple Carrier Frequency Offsets" IEEE GLOBECOM 2009, 6 pages.

* cited by examiner

*Primary Examiner* — Juan A Torres
(74) *Attorney, Agent, or Firm* — Brinks Gilson & Lione (57) ABSTRACT

A method and an apparatus for correcting a frequency offset are provided. The method includes: receiving n channels of first signals; performing frequency offset correction processing on the n channels of first signals to obtain n channels of first corrected signals; acquiring n center tap coefficients of a space time equalizer, n first output phases of a phase-locked loop phase detector, and a second output phase of a phase-locked loop phase detector; acquiring n first estimated frequency offset values according to the n center tap coefficients and the n first output phases; acquiring a second estimated frequency offset value according to the second output phase; and receiving n channels of second signals, and performing frequency offset correction on the n channels of second signals according to the n first estimated frequency offset values and the second estimated frequency offset value.

15 Claims, 6 Drawing Sheets

METHOD AND APPARATUS FOR CORRECTING FREQUENCY OFFSET

CROSS-REFERENCE TO RELATED APPLICATIONS

This application is a continuation of International Application No. PCT/CN2012/075936, filed on May 23, 2012, which is hereby incorporated by reference in its entirety.

FIELD

The present disclosure relates to the field of communications technologies, and in particular to a method and an apparatus for correcting a frequency offset, where the method and the apparatus for correcting a frequency offset are applied to a distributed multiple input multiple output (MIMO) system.

BACKGROUND

The MIMO technology is an effective means for improving spectral efficiency of a communication system by using a multi-antenna technology, and has a very high application value in wireless communications and microwave communications. In a MIMO system, different antenna pairs form multiple different sub-channels, and according to a different transmission feature of a signal on a different sub-channel, a receiving end may decode and identify data on a different transmitting antenna by using a corresponding algorithm, so that an effect that multiple channels of information are transmitted simultaneously on the same frequency band is achieved and spectral efficiency is doubled.

In a distributed MIMO system, antennas are far away from each other, each antenna is connected to an independent outdoor unit(ODU), and each ODU includes a local oscillator (LO). Due to a difference of an LO device in each ODU, multiple channels of baseband signals received by one antenna at a receiving end have different carrier frequency offsets (CFOs, also referred to as frequency offsets), so that it is difficult for a decoding system at the receiving end to converge to a stable decoding state and decoding performance is significantly deteriorated.

In the prior art, a known sequence with a special structure is inserted in transmission data of a baseband signal, for example, a constant amplitude zero auto correlation (CAZAC) sequence, and the sequence is sent on different antennas simultaneously. By using orthogonality between time and space of the sequence, a CFO parameter of the distributed MIMO system may be obtained through calculation, and correction of a signal is implemented according to the CFO parameter, so as to improve the decoding performance.

Because the known sequence is inserted in the transmission data of the baseband signal, effective transmission of the data is affected; and furthermore, a process of calculating the CFO parameter of the distributed MIMO system according to the known sequence is intermittent and does not have a dynamic tracing feature.

SUMMARY

To ensure effective transmission of data, embodiments of the present disclosure provide a method and an apparatus for correcting a frequency offset. The solutions are as follows:

In one aspect, a method for correcting a frequency offset in a distributed multiple input multiple output MIMO system is provided and includes: receiving n channels of first signals, where n is a positive integer; performing frequency offset correction processing on the n channels of first signals to obtain n channels of first corrected signals; acquiring n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, where the superposed signal is a signal that is obtained after the n channels of first corrected signals are superposed one by one; acquiring n first estimated frequency offset values according to the n center tap coefficients and the n first output phases; acquiring a second estimated frequency offset value according to the second output phase; and receiving n channels of second signals, and performing frequency offset correction on the n channels of second signals according to the n first estimated frequency offset values and the second estimated frequency offset value.

In another aspect, an apparatus for correcting a frequency offset in a distributed multiple input multiple output (MIMO) system is provided and includes: a receiver, a processor, an acquiring unit, a first estimation acquiring unit, a second estimation acquiring unit, and. The receiver is configured to receive n channels of first signals, where n is a positive integer. The processor is configured to perform frequency offset correction processing on the n channels of first signals to obtain n channels of first corrected signals. The acquiring unit is configured to acquire n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, where the superposed signal is a signal that is obtained after the n channels of first corrected signals are superposed one by one. The first estimation acquiring unit is configured to acquire n first estimated frequency offset values according to the n center tap coefficients and the n first output phases. The second estimation acquiring unit is configured to acquire a second estimated frequency offset value according to the second output phase. The receiving and correcting unit is configured to receive n channels of second signals, and perform frequency offset correction on the n channels of second signals according to the n first estimated frequency offset values and the second estimated frequency offset value.

Beneficial effects of the solutions provided in the embodiments of the present disclosure are: n first estimated frequency offset values, that is, estimated frequency offset values of a receiving end, are acquired according to n center tap coefficients that correspond to n channels of first corrected signals and n first output phases that correspond to the n channels of first corrected signals; and a second estimated frequency offset value of a sending end is acquired according to a second output phase that corresponds to a superposed signal. That is, an estimated frequency offset does not need to be calculated by using a method that a known sequence is inserted in transmission data of a baseband signal, but an estimated frequency offset of each of the receiving end and the sending end may be acquired according to the transmission data of the baseband signal, that is, a first corrected signal, and then frequency offset correction is performed, according to the estimated frequency offset of the receiving end and the estimated frequency offset of the sending end, on n channels of second signals currently received, thereby ensuring effective transmission of data.

In addition, in the embodiments, a frequency offset is estimated according to the transmission data of the baseband signal, and a transmission process of the transmission data is successive, therefore the method described in the embodiments has a dynamic tracing feature; a process of calculating the estimated frequency offset of the receiving end and the estimated frequency offset of the sending end does not involve high-dimensional matrix calculation, thereby reducing operation complexity; and in the embodiments, frequency offsets of the two ends: the receiving end and the sending end, may be compensated at the receiving end, and compared with the prior art in which a frequency offset of a sending end is compensated at the sending end in a feedback manner, complexity of a compensation system is reduced.

BRIEF DESCRIPTION OF THE DRAWINGS

To illustrate the solutions in the embodiments of the present disclosure more clearly, the following briefly introduces the accompanying drawings needed for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

To make the objectives, solutions, and advantages of the present disclosure more comprehensible, the following further describes the embodiments of the present disclosure in detail with reference to the accompanying drawings.

Due to a difference of an LO device in each ODU, multiple channels of baseband signals received by one antenna at a receiving end have different CFOs, which greatly affects data decoding of a decoding system at the receiving end. 2*2MIMO is taken as an example in the following to describe an effect imposed by a CFO on data decoding by comparing two kinds of transmission systems: a transmission system in which a CFO does not exist and a transmission system in which a CFO exists.

Formula (1) shows the transmission system in which a CFO does not exist, which is shown as follows:

$$R = \begin{bmatrix} r_1 \\ r_2 \end{bmatrix} = H \cdot S + N = \begin{bmatrix} h_{11} & h_{21} \\ h_{12} & h_{22} \end{bmatrix} \cdot \begin{bmatrix} s_1 \\ s_2 \end{bmatrix} + \begin{bmatrix} n_1 \\ n_2 \end{bmatrix} \quad (1)$$

where, R represents a vector of a received signal, H represents a transmission channel matrix, S represents a vector of a transmitted signal, and N represents a noise vector.

In this transmission system, after a decoding algorithm of the receiving end is stable, the decoding system converges to a state shown in formula (2), which is shown as follows:

$$\hat{S} = H' \cdot R \quad (2)$$

where, $\hat{S}$ represents estimation of S, that is, an estimated vector of the transmitted signal, and H' represents approximation of an inverse matrix of H.

Formula (3) shows the transmission system in which a CFO exists, which is shown as follows:

$$R_c = \begin{bmatrix} e^{j\omega_{r1}t} & 0 \\ 0 & e^{j\omega_{r2}t} \end{bmatrix} \left( H \cdot \begin{bmatrix} e^{j\omega_{s1}t} & 0 \\ 0 & e^{j\omega_{s2}t} \end{bmatrix} \cdot S + N \right) = \quad (3)$$

$$(H_{wr} \cdot H \cdot H_{wt}) \cdot S + N' = H_w \cdot S + N'$$

where, $R_c$ represents a vector of a received signal when a CFO exists, $\omega_{sn}$ represents a CFO on an $n^{th}$ channel of transmitting ODU, $\omega_{rn}$ represents a CFO on an $n^{th}$ channel of receiving ODU, H represents a transmission channel matrix, S represents a vector of a transmitted signal, N represents a noise vector, $H_w$ represents a transmission channel matrix when a CFO exists, N' represents a noise vector when a CFO exists, $H_{wr}$ represents a parameter matrix of a frequency offset introduced at a receiving end due to an LO difference, and $H_{wt}$ represents a parameter matrix of a frequency offset introduced at a sending end due to an LO difference.

In this transmission system, the decoding system needs to converge to a state shown in formula (4) to complete decoding, which is shown as follows:

$$\hat{S} = H_w' \cdot R_c \quad (4)$$

where, $H_w'$ represents approximation of an inverse matrix of $H_w$.

It may be seen by comparing formula (2) and formula (4) that, the matrix H' is a quantity that is irrelevant to time t, while because a CFO exists, the matrix $H_w'$ is a quantity that changes fast with time t. In the transmission system in which a CFO does not exist, it is easy for the decoding system to converge to a stable decoding state; while in the transmission system in which a CFO exists, it is difficult for the decoding system to trace a fast change of the matrix $H_w'$, so that decoding performance is deteriorated.

The following embodiment may be described by taking the transmission system shown in formula (3) as an example.

Embodiment 1

Figure 1:
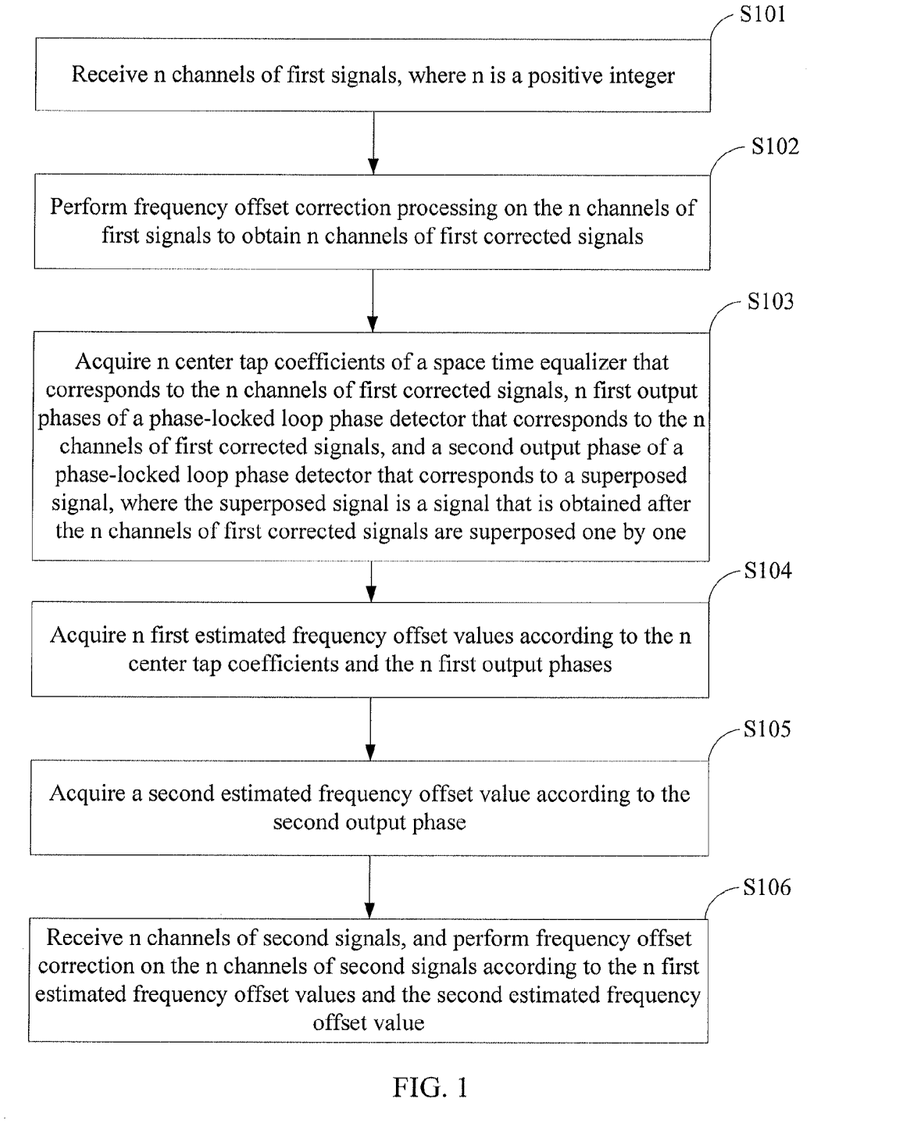
FIG. 1 is a flow chart of an embodiment of a method for correcting a frequency offset in a distributed MIMO system according to Embodiment 1 of the present disclosure.

Refer to FIG. 1, which is a flow chart of an embodiment of a method for correcting a frequency offset in a distributed MIMO system according to Embodiment 1 of the present disclosure.

The method for correcting a frequency offset in the distributed MIMO system includes:

S101: Receive n channels of first signals, where n is a positive integer.

S102: Perform frequency offset correction processing on the n channels of first signals to obtain n channels of first corrected signals.

S103: Acquire n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, where the superposed signal is a signal that is obtained after the n channels of first corrected signals are superposed one by one.

S104: Acquire n first estimated frequency offset values according to the n center tap coefficients and the n first output phases.

S105: Acquire a second estimated frequency offset value according to the second output phase.

S106: Receive n channels of second signals, and perform frequency offset correction on the n channels of second signals according to the n first estimated frequency offset values and the second estimated frequency offset value.

In this embodiment, n first estimated frequency offset values, that is, estimated frequency offset values of a receiving end, are acquired according to n center tap coefficients that correspond to n channels of first corrected signals and n first output phases that correspond to the n channels of first corrected signals; and a second estimated frequency offset value of a sending end is acquired according to a second output phase that corresponds to a superposed signal. That is, an estimated frequency offset does not need to be calculated by using a method that a known sequence is inserted in transmission data of a baseband signal, but an estimated frequency offset of each of the receiving end and the sending end may be acquired according to the transmission data of the baseband signal, that is, a first corrected signal, and then frequency offset correction is performed, according to the estimated frequency offset of the receiving end and the estimated frequency offset of the sending end, on n channels of second signals currently received, thereby ensuring effective transmission of data.

In addition, in this embodiment, a frequency offset is estimated according to the transmission data of the baseband signal and a transmission process of the transmission data is successive, therefore the method described in this embodiment has a dynamic tracing feature; a process of calculating the estimated frequency offset of the receiving end and the estimated frequency offset of the sending end does not involve high-dimensional matrix calculation, thereby reducing operation complexity; and in this embodiment, frequency offsets of the two ends: the receiving end and the sending end, may be compensated at the receiving end, and compared with the prior art in which a frequency offset of a sending end is compensated at the sending end in a feedback manner, complexity of a compensation system is reduced.

Embodiment 2

Figure 2:
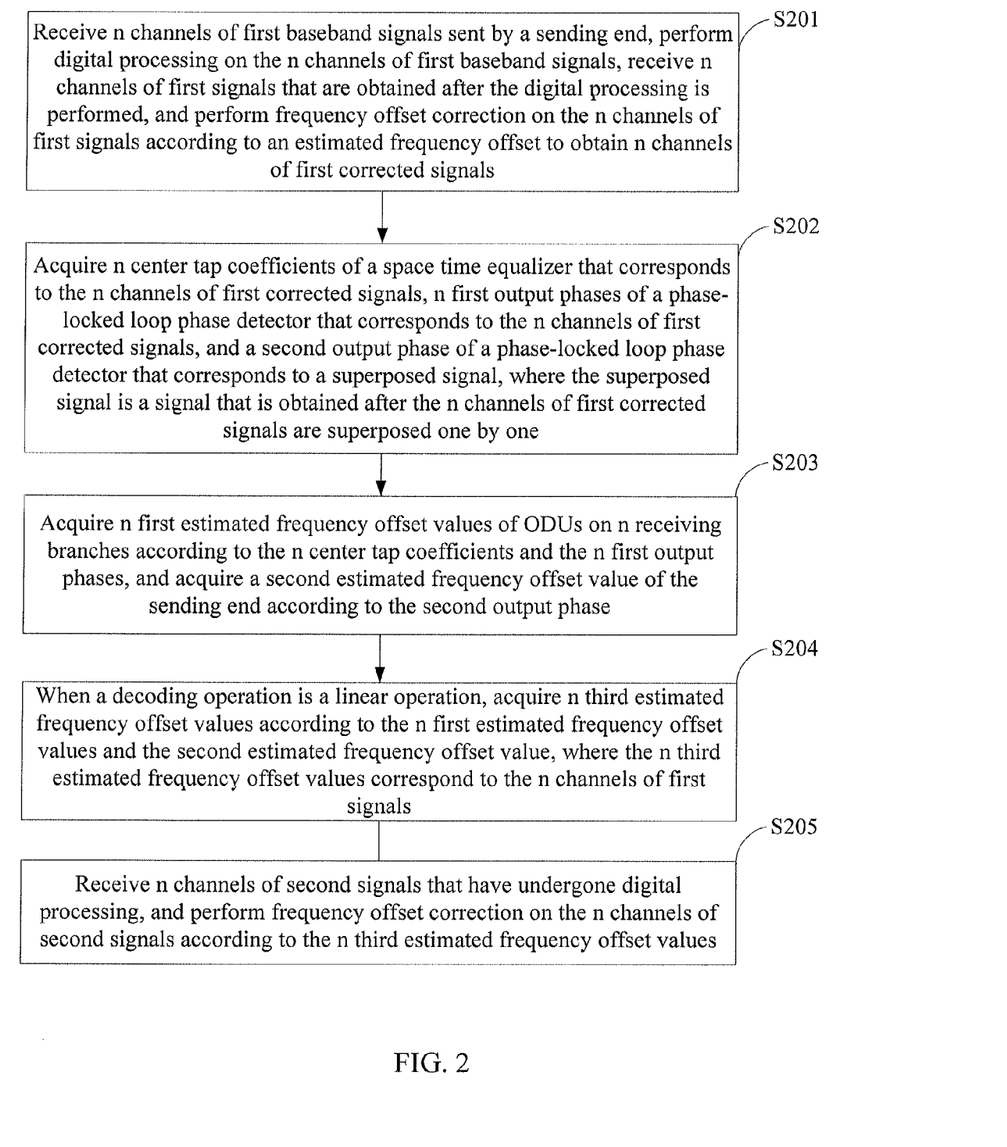
FIG. 2 is a flow chart of an embodiment of a method for correcting a frequency offset in a distributed MIMO system according to Embodiment 2 of the present disclosure.

Refer to FIG. 2, which is a flow chart of an embodiment of a method for correcting a frequency offset in a distributed MIMO system according to Embodiment 2 of the present disclosure.

The method for correcting a frequency offset in the distributed MIMO system includes:

S201: Receive n channels of first baseband signals sent by a sending end, perform digital processing on the n channels of first baseband signals, receive n channels of first signals that are obtained after the digital processing is performed, and perform frequency offset correction on the n channels of first signals according to an estimated frequency offset to obtain n channels of first corrected signals.

In this step, when a receiving end receives a first baseband signal for the first time, where the first baseband signal is sent by a sending end, and after the first baseband signal sequentially passes through a receiving antenna and an ODU, a baseband processing system, for example, an IDU (InDoor Unit, indoor unit), receives and processes the first baseband signal, and performs analog to digital conversion and filter processing on the first baseband signal to generate a first signal, where the first signal is a digital signal. One first baseband signal is received on each of n receiving branches of the baseband processing system at the receiving end, each receiving branch processes the first baseband signal according to the foregoing procedure to generate n channels of first signals, where the first signals include a CFO of the receiving end and a CFO of the sending end.

When the receiving end receives the first baseband signal for the first time, where the first baseband signal is sent by the sending end, the estimated frequency offset is 0. Therefore, the n channels of first corrected signals obtained by performing frequency offset correction on the n channels of first signals according to the estimated frequency offset are still the n channels of first signals, where the first corrected signals also include a CFO of the receiving end and a CFO of the sending end.

S202: Acquire n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, where the superposed signal is a signal that is obtained after the n channels of first corrected signals are superposed one by one.

In this embodiment, after obtaining the n channels of first corrected signals, the baseband processing system at the receiving end performs MIMO signal decoding processing on the n channels of first corrected signals, and specifically, may perform, on the n channels of first corrected signals, space time equalization processing and phase locking processing sequentially through an STE (Space Time Equalizer, space time equalizer) and a phase-locked loop phase detector, respectively, to implement decoding and obtain n channels of first decoded corrected signals, and then perform combination and decision processing on the n channels of first decoded corrected signals to obtain a single channel of decoded signal. Outputs of the space time equalizer and the phase-locked loop phase detector also change as a transmission signal on a channel is different, and n is a positive integer.

When the n channels of first corrected signals sequentially pass through the STE and the phase-locked loop phase detector, n center tap coefficients of the STE on a signal channel that corresponds to the n channels of first corrected signals, n first output phases of the phase-locked loop phase detector on the signal channel that corresponds to the n channels of first corrected signals, and a second output phase of a phase-locked loop phase detector that corresponds to a superposed signal that is obtained after the n channels of first corrected signals are superposed one by one, are acquired respectively.

In an adaptive STE loop, a frequency offset continues to change a gradient direction for a decision error, so that a statistical offset is formed. Because an adaptive STE traces the gradient direction of the error, a center tap coefficient of the STE may indicate a direction of the frequency offset, where a center tap coefficient of an STE on a branch channel reflects CFO information of different ODUs at a receiving end.

Because a phase-locked loop can trace and lock a phase deviation of a signal, and in a tracing process, a phase output by the phase-locked loop phase detector is also accumulated with the time according to the direction of the frequency offset, an output phase of the phase-locked loop phase detector can indicate the frequency offset, where an output phase of a phase-locked loop phase detector on a branch channel, that is a first output phase, reflects CFO information of different ODUs at the receiving end; and an output phase of a phase-locked loop phase detector on a superposed channel, that is a second output phase, reflects CFO information of an ODU at a sending end, where the ODU corresponds to a decoded signal.

S203: Acquire n first estimated frequency offset values of ODUs on n receiving branches according to the n center tap coefficients and the n first output phases, and acquire a second estimated frequency offset value of the sending end according to the second output phase.

In this embodiment, a CFO is estimated through information of the STE and the phase-locked loop, that is, the CFO is estimated through the center tap coefficient of the STE and the output phase of the phase-locked loop phase detector, so as to implement blind frequency offset estimation, so that an estimated frequency offset of the sending end and an estimated frequency offset of the receiving end may be obtained without depending on calculation of a known sequence.

Figure 3:
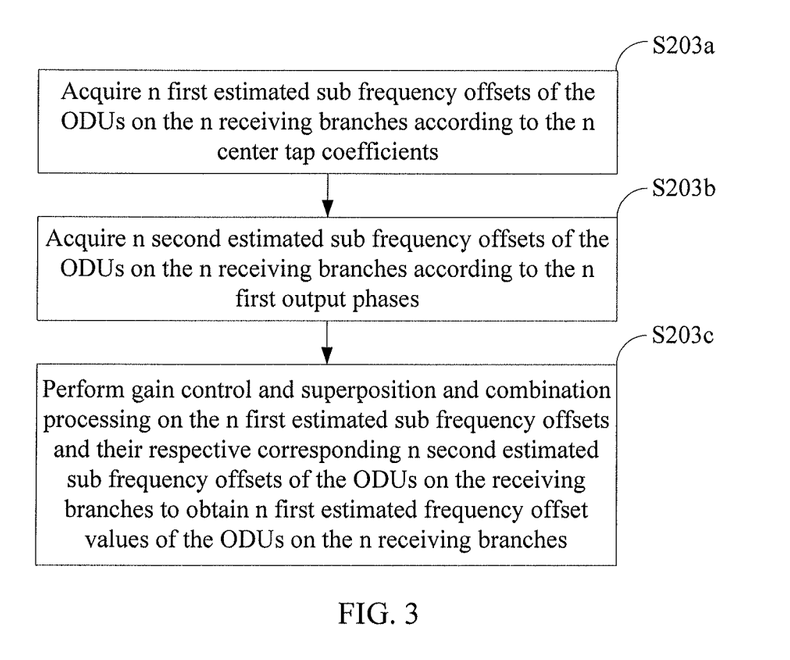
FIG. 3 is a schematic diagram of a calculation procedure of first estimated frequency offset values according to Embodiment 2 of the present disclosure.

Specifically, reference may be made to FIG. 3, where FIG. 3 is a schematic diagram of a calculation procedure of first estimated frequency offset values according to Embodiment 2 of the present disclosure.

A calculation process of the first estimated frequency offset values includes:

S203a: Acquire n first estimated sub frequency offsets of the ODUs on the n receiving branches according to the n center tap coefficients.

Specifically, instantaneous phase information of each of the n center tap coefficients is extracted to obtain n pieces of instantaneous phase information; a differential operation is performed on each of the n pieces of instantaneous phase information to obtain n pieces of first frequency information; amplitude limiting processing is performed on each of the n pieces of first frequency information to obtain n pieces of first amplitude-limited frequency information; and low-pass filtering processing is performed on each of the n pieces of first amplitude-limited frequency information to obtain n first estimated sub frequency offsets of the ODUs on the n receiving branches.

S203b: Acquire n second estimated sub frequency offsets of the ODUs on the n receiving branches according to the n first output phases.

Specifically, a differential operation is perform on each of the n first output phases to obtain n pieces of second frequency information; and low-pass filtering processing is performed on each of the n pieces of second frequency information to obtain n second estimated sub frequency offsets of the ODUs on the n receiving branches.

S203c: Perform gain control and superposition and combination processing on the n first estimated sub frequency offsets and their respective corresponding n second estimated sub frequency offsets of the ODUs on the n receiving branches to obtain n first estimated frequency offset values of the ODUs on the n receiving branches.

Figure 4:
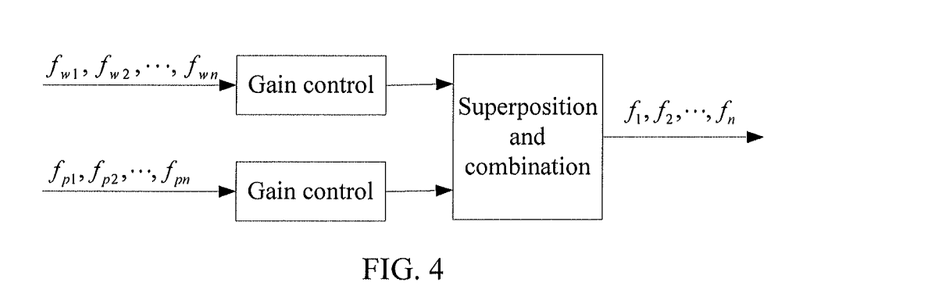
FIG. 4 is a schematic diagram of a combination of the first estimated frequency offset values according to Embodiment 2 of the present disclosure.

Specifically, gain control, that is, weighting control, is performed on each first estimated sub frequency offset and each second estimated sub frequency offset according to credibility of estimated data, and then superposition and combination are performed on each first gain-controlled estimated sub frequency offset and its corresponding second gain-controlled estimated sub frequency offset to obtain n first estimated frequency offset values of the ODUs on the n receiving branches. As shown in FIG. 4, FIG. 4 is a schematic diagram of a combination of the first estimated frequency offset values according to Embodiment 2 of the present disclosure. $f_{wn}$ represents a first estimated sub frequency offset of an ODU on an $n^{th}$ receiving branch, $f_{pn}$ represents a second estimated sub frequency offset of the ODU on the $n^{th}$ receiving branch, and $f_n$ represents a first estimated frequency offset value of the ODU on the $n^{th}$ receiving branch.

The center tap coefficient and the first output phase of the STE both reflect CFO information of different ODUs at the receiving end. The first estimated sub frequency offset and the second estimated sub frequency offset are combined by gain control etc, so that robustness of estimation tracing may be further improved, where the first estimated sub frequency offset is obtained according to the center tap coefficient of the STE, and the second estimated sub frequency offset is obtained according to the first output phase.

In this step, a procedure of acquiring a second estimated frequency offset value of the sending end according to the second output phase is similar to that in step S203b. Specifically, a differential operation is performed on the second output phase to obtain third frequency information; and low-pass filtering processing is performed on the third frequency information to obtain a second estimated frequency offset value of the sending end.

S204: When a decoding operation is a linear operation, acquire n third estimated frequency offset values according to the n first estimated frequency offset values and the second estimated frequency offset value, where the n third estimated frequency offset values correspond to the n channels of first signals.

In this step, after the estimated frequency offset of the ODU at the receiving end, that is, the n first estimated frequency offset values, and the estimated frequency offset of the ODU at the sending end, that is, the second estimated frequency offset value, are obtained, the baseband processing system needs to determine whether a decoding operation in MIMO signal decoding processing is a linear operation, where the decoding operation satisfies linearity generally.

When the decoding operation is a linear operation, frequency offset compensation of the ODU at the sending end may be performed before decoding processing and be completed by being combined with frequency offset compensation of the ODU at the receiving end, that is, the n first estimated frequency offset values of the ODUs on the n receiving branches are combined with the second estimated frequency offset value of the sending end to compensate frequency offsets of the receiving end and the sending end together.

Specifically, n third estimated frequency offset values are acquired according to the n first estimated frequency offset values of the ODUs on the n receiving branches and the second estimated frequency offset value of the sending end, where the n third estimated frequency offset values correspond to the n channels of first signals.

Gain control processing is performed on the second estimated frequency offset value according to credibility of estimated data, and the second estimated frequency offset value that has undergone the gain control processing is combined with the n first estimated frequency offset values of the ODUs on the n receiving branches, that is, the second estimated frequency offset value is added to each first estimated frequency offset value, to obtain n third estimated frequency offset values that correspond to the n channels of first signals.

S205: Receive n channels of second signals that have undergone digital processing, and perform frequency offset correction on the n channels of second signals according to the n third estimated frequency offset values.

In this embodiment, the first corrected signal is a first signal that has undergone frequency offset correction processing. In this embodiment of the present disclosure, after frequency offset estimation is performed on a first signal received last time, frequency offset compensation is performed on a second signal currently received.

After the n third estimated frequency offset values are obtained, preprocessing is performed on the n third estimated frequency offset values; and it is determined whether each of n third preprocessed estimated frequency offset values converges, if yes, frequency offset correction is performed on each of the n channels of second signals according to the n third preprocessed estimated frequency offset values to obtain a signal without a frequency offset, and if no, frequency offset correction is performed on each of the n channels of second signals according to the n third preprocessed estimated frequency offset values to obtain the n channels of first corrected signals, and then step S202 to S204 are performed again until a signal without a frequency offset is obtained.

The performing preprocessing on each of the n third estimated frequency offset values includes:

multiplying each of the n third estimated frequency offset values by a preset step to obtain n fourth estimated frequency offset values; and superposing the n fourth estimated frequency offset values on n corresponding locally-stored fifth estimated frequency offset values respectively to obtain n third iterated estimated frequency offset values.

The determining whether each of the n third preprocessed estimated frequency offset values converges includes:

determining whether each of the n fourth estimated frequency offset values is less than or equal to a preset threshold, where if each of the n fourth estimated frequency offset values is less than or equal to the preset threshold, it indicates that the n third estimated frequency offset values that have undergone a current iteration converge; and if each of the n fourth estimated frequency offset values is greater than the preset threshold, it indicates that the n third estimated frequency offset values that have undergone the current iteration do not converge.

Specifically, to determine whether the n third estimated frequency offset values that have undergone the preprocessing, that is, the current iteration, converge, it needs to determine whether a difference between a third estimated frequency offset value that has undergone the current iteration and a fifth estimated frequency offset value that has undergone a last iteration is less than or equal to a preset threshold generally. In this embodiment, the difference is a fourth estimated frequency offset value, and preferably, the preset threshold is 0.

In this embodiment, after the n third estimated frequency offset values that have undergone the current iteration are acquired, each of the n corresponding locally-stored fifth estimated frequency offset values may also be updated according to the n third estimated frequency offset values that have undergone the current iteration. Specifically, in this embodiment, preferably, each local register saves only an estimated frequency offset value that has undergone the current iteration, that is, an original fifth estimated frequency offset value in a local register is replaced with a third estimated frequency offset value that has undergone the current iteration, where the third estimated frequency offset value that has undergone the current iteration is used as a new fifth estimated frequency offset value, to which this embodiment is not limited. In this embodiment, each local register may also save N fifth estimated frequency offset values according to an iteration sequence, where an $N^{th}$ estimated frequency offset value is a third estimated frequency offset value that has undergone the current iteration, and N is a positive integer that is greater than 1. In this case, a fifth estimated frequency offset value in an iteration operation that is performed on the n fourth estimated frequency offset values and their respective n corresponding locally-stored fifth estimated frequency offset values is a third estimated frequency offset value that has undergone an $(n-1)^{th}$ iteration; and in this case, updating of a register is not limited here, an estimated frequency offset value that has undergone the current iteration may be directly saved in the register, and the estimated frequency offset value that has undergone the current iteration may also be saved and a first estimated frequency offset value in the local register is deleted, which is not described here again.

In this step, the performing frequency offset correction on each of the n channels of second signals according to the n third estimated frequency offset values that have undergone the current iteration includes:

performing an integral operation on each of the n third estimated frequency offset values that have undergone the current iteration to obtain n pieces of estimated phase information; and performing, according to the n pieces of estimated phase information, phase modulation on n channels of second signals currently received.

By taking CFO compensation of a first channel of signal s1 as an example, a transmission system shown in formula (3) may converge to a state shown in formula (5) according to the foregoing method for correcting a frequency offset, which is shown as follows:

$$\hat{s}_1 = [h'_{11} \ h'_{21}] \cdot e^{-j\omega_{s'1}t}. \qquad (5)$$

$$R_{cmp} = [h'_{11} \ h'_{21}] \cdot \begin{bmatrix} e^{-j(\omega'_{r1}+\omega_{s'1})t} & 0 \\ 0 & e^{-j(\omega'_{r2}+\omega_{s'1})t} \end{bmatrix} R_c$$

where, $\hat{s}_1$ represents estimation of a first channel of transmitted signal s1, that is, an estimated vector of the first channel of transmitted signal s1; $h_{11}'$, and $h_{21}'$ represent two elements of H' respectively, and correspond to inverse mappings of a first channel of received signal and a second channel of received signal, where the inverse mappings are relative to the first channel of transmitted signal s1; $\omega_{r1}'$ represents an estimated CFO of a first channel of receiving ODU, and $\omega_{s'1}$ represents an estimated CFO of a first channel of sending ODU; $R_{cmP}$ represents a vector of a received signal after a frequency offset of a receiving end is compensated; and $R_c$ represents a vector of a receiving signal when a CFO exists.

In this embodiment, in an n×n MIMO system, a sending end has n frequency offsets, and a receiving end also has n frequency offsets, and data of each receiving antenna is a mixture of data of n transmitting antennas. In a complete receiving system, there are n similar receiving structures, and each receiving structure decodes data of n receiving antennas to output data of one transmitting antenna. In this embodiment, only a channel of transmitted data that is to be decoded by one receiving structure is concerned, and therefore, only one output phase of a transmitting end and one frequency offset of the transmitting end are output.

In this embodiment, n first estimated frequency offset values, that is, estimated frequency offset values of a receiving end, are acquired according to n center tap coefficients that correspond to n channels of first corrected signals and n first output phases that correspond to the n channels of first corrected signals; and a second estimated frequency offset value of a sending end is acquired according to a second output phase that corresponds to a superposed signal. That is, an estimated frequency offset does not need to be calculated by using a method that a known sequence is inserted in transmission data of a baseband signal, but an estimated frequency offset of each of the receiving end and the sending end may be acquired according to the transmission data of the baseband signal, that is, a first corrected signal, and then frequency offset correction is performed, according to the estimated frequency offset of the receiving end and the estimated frequency offset of the sending end, on n channels of second signals currently received, thereby ensuring effective transmission of data.

In addition, in this embodiment, a frequency offset is estimated according to the transmission data of the baseband signal and a transmission process of the transmission data is successive, therefore the method described in this embodiment has a dynamic tracing feature; a process of calculating the estimated frequency offset of the receiving end and the estimated frequency offset of the sending end does not involve high-dimensional matrix calculation, thereby reducing operation complexity; in this embodiment, frequency offsets of the two ends: the receiving end and the sending end, may be compensated at the receiving end, and compared with the prior art in which a frequency offset of a sending end is compensated at the sending end in a feedback manner, complexity of a compensation system is reduced and system construction and configuration are simplified; and the frequency offset is estimated and corrected by using a signal processing technology, so that a restriction on and a selection cost of a hardware device are reduced.

Embodiment 3

Figure 5:
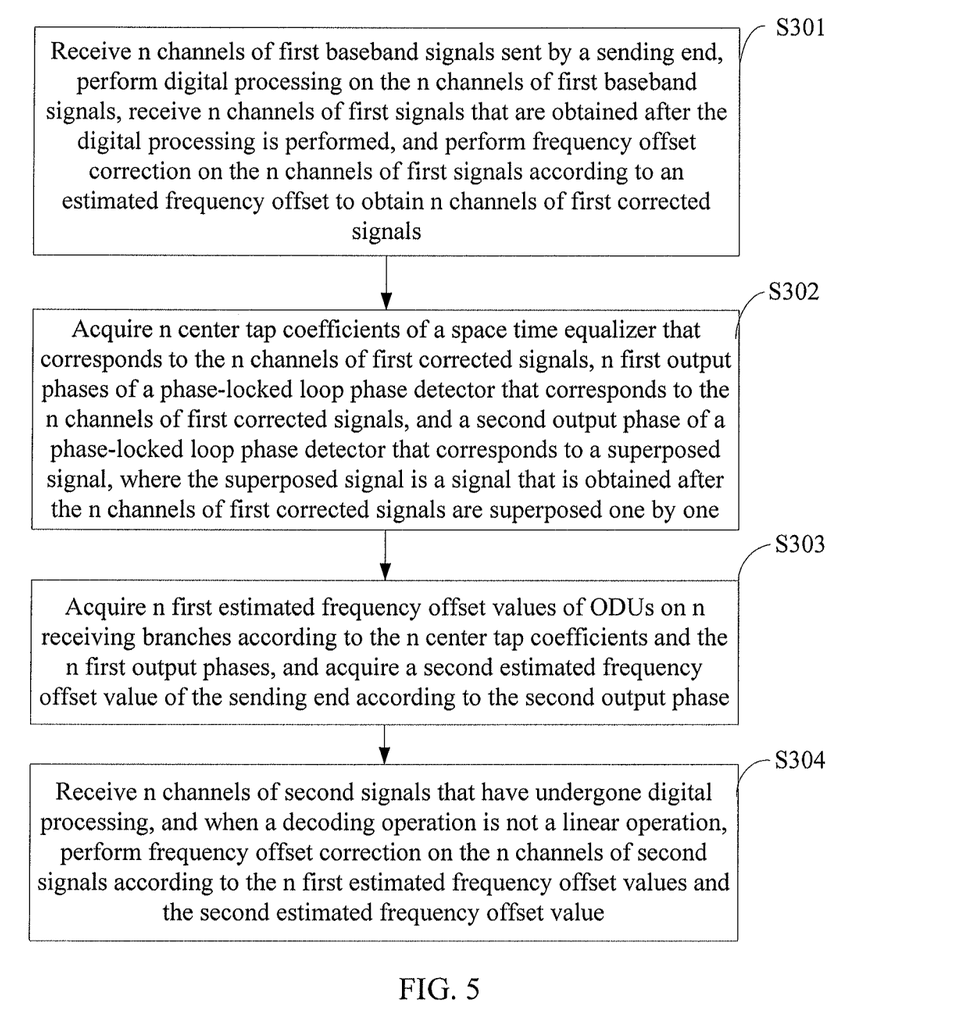
FIG. 5 is a flow chart of an embodiment of a method for correcting a frequency offset in a distributed MIMO system according to Embodiment 3 of the present disclosure.

Refer to FIG. 5, which is a flow chart of an embodiment of a method for correcting a frequency offset in a distributed MIMO system according to Embodiment 3 of the present disclosure.

The method for correcting a frequency offset in the distributed MIMO system includes:

S5301: Receive n channels of first baseband signals sent by a sending end, perform digital processing on the n channels of first baseband signals, receive n channels of first signals that are obtained after the digital processing is performed, and perform frequency offset correction on the n channels of first signals according to an estimated frequency offset to obtain n channels of first corrected signals.

Step S301 in this embodiment is similar to step S201 in Embodiment 2, and is not described here again. For details, reference may be made to the relevant description in Embodiment 2.

S302: Acquire n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, where the superposed signal is a signal that is obtained after the n channels of first corrected signals are superposed one by one.

Step S302 in this embodiment is similar to step S202 in Embodiment 2, and is not described here again. For details, reference may be made to the relevant description in Embodiment 2.

S303: Acquire n first estimated frequency offset values of ODUs on n receiving branches according to the n center tap coefficients and the n first output phases, and acquire a second estimated frequency offset value of the sending end according to the second output phase.

Step S303 in this embodiment is similar to step S203 in Embodiment 2, and is not described here again. For details, reference may be made to the relevant description in Embodiment 2.

S304: Receive n channels of second signals that have undergone digital processing, and when a decoding operation is not a linear operation, perform frequency offset correction on the n channels of second signals according to the n first estimated frequency offset values and the second estimated frequency offset value.

In this embodiment, the first corrected signal is a first signal that has undergone frequency offset correction processing. In this embodiment of the present disclosure, after frequency offset estimation is performed on a first signal received last time, frequency offset compensation is performed on a second signal currently received.

In this step, after an estimated frequency offset of an ODU at a receiving end, that is, the n first estimated frequency offset values, and an estimated frequency offset of an ODU at the sending end, that is, the second estimated frequency offset value, are obtained, a baseband processing system needs to determine whether a decoding operation in MIMO signal decoding processing is a linear operation.

When the decoding operation is not a linear operation, frequency offset compensation at the receiving end needs to be performed according to the n first estimated frequency offset values before decoding processing to obtain n channels of first corrected signals; then MIMO signal decoding processing is performed on the n channels of first corrected signals to obtain n channels of first decoded corrected signals; and then frequency offset compensation at the sending end is performed according to the second estimated frequency offset value before combination and decision processing is performed on the n channels of first corrected signals, to obtain n channels of second corrected signals.

Specifically, when the decoding operation is not a linear operation, preprocessing is performed on each of the n first estimated frequency offset values of the ODUs on the n receiving branches; and it is determined whether each of n first preprocessed estimated frequency offset values converges, and if yes, frequency offset correction is performed on each of the n channels of second signals according to the n first preprocessed estimated frequency offset values to obtain a first corrected signal; and frequency offset correction is performed on a first decoding-processed corrected signal according to the second estimated frequency offset value of the sending end to obtain a signal without a frequency offset, that is, the second corrected signal. If the n first preprocessed estimated frequency offset values do not converge, frequency offset correction is performed, according to the n first preprocessed estimated frequency offset values, on each of the n channels of second signals currently received, to obtain the n channels of first corrected signals; and then steps S302-S304 are performed again until a signal without a frequency offset is obtained.

After the n channels of first corrected signals are obtained, MIMO signal decoding processing is performed on the n channels of first corrected signals to obtain n channels of first decoded corrected signals; and frequency offset compensation at the sending end is performed according to the second estimated frequency offset value before decision processing is performed on the n channels of first decoded corrected signals, to obtain n channels of second corrected signals. In this case, the obtained second corrected signals still have a frequency offset, and therefore, the foregoing procedure in this embodiment still needs to be repeated until a signal without a frequency offset is obtained.

The performing preprocessing on each of the n first estimated frequency offset values of the ODUs on the n receiving branches includes: performing weighting processing on the n first estimated frequency offset values of the ODUs on the n receiving branches once; and performing iteration processing on the first estimated frequency offset value that has undergone the weighting processing, to obtain a first preprocessed estimated frequency offset value, that is, the first estimated frequency offset value that has undergone a current iteration. For details, reference may be made to the relevant description in Embodiment 2.

With the method described in this embodiment, stepping compensation is performed according to estimated CFO data, and bandwidth of a "estimation-correction" loop is adjusted through an iteration and step control, so that parameters of an equalizer and a phase-locked loop are gradually stable when MIMO signal processing is performed on gradually-compensated CFO data. In this case, a change of extracted phase information gradually becomes slight, and finally, an output of frequency offset estimation is driven to converge to a correct CFO compensation value, so that a system enters a stable working state.

To facilitate understanding, a compensation process of a decoding system is described in detail in the following. For a transmission system shown in formula (3), an objective of CFO compensation is to remove time-varying parameters $\omega_{rn}^t$ and $\omega_{sn}^t$ in a composite matrix $H_w$.

First, a frequency offset $H_{wr}$ of a receiving end in a received signal is compensated according to a first estimated frequency offset value of the receiving end, as shown in formula (6):

$$R_{cmp} = \begin{bmatrix} e^{-j\omega'_{r1}t} & 0 \\ 0 & e^{-j\omega'_{r2}t} \end{bmatrix} R_c = H_{w'r}((H_{wr} \cdot H \cdot H_{wt}) \cdot S + N') \quad (6)$$

where, $R_{cmp}$ represents a vector of a received signal after a frequency offset of a receiving end is compensated, $\omega'_{rn}$ represents an estimated CFO of an $n^{th}$ channel of receiving ODU, $R_c$ represents a vector of a received signal when a CFO exists, $H_{w'r}$ represents a parameter matrix for estimating the frequency offset of the receiving end, $H_{wr}$ represents a parameter matrix of a frequency offset introduced at the receiving end due to an LO difference, H represents a transmission channel matrix, $H_{wt}$ represents a parameter matrix of a frequency offset introduced at a sending end due to an LO difference, S represents a vector of a transmitted signal, and N' represents a noise vector when a CFO exists.

After a CFO of the receiving end is accurately estimated and compensated, the transmission system changes to:

$$R_{cmp} = H \cdot H_{wt} \cdot S + N'' \quad (7)$$

where, $R_{cmp}$ represents the vector of the received signal after the frequency offset of the receiving end is compensated, H represents a transmission channel matrix, $H_{wt}$ represents the parameter matrix of the frequency offset introduced at the sending end due to the LO difference, S represents the vector of the transmitted signal, and N" represents a noise vector after the CFO of the receiving end is compensated.

In this case, there is only a residual frequency offset $H_{wt}$ of an ODU at the sending end in the system. To eliminate an effect on a decoding system, which is imposed by a CFO of the sending end, a sent signal ($H_{wt} \cdot S$) that is impaired by the frequency offset needs to be used as a decoding target, and an obtained decoding model is:

$$\hat{S}_{cfo} = H_{wt} \cdot \hat{S} = \begin{bmatrix} e^{j\omega_{s1}t} & 0 \\ 0 & e^{j\omega_{s2}t} \end{bmatrix} \cdot \hat{S} = H' \cdot R_{cmp} = \begin{bmatrix} h'_{11} & h'_{21} \\ h'_{12} & h'_{22} \end{bmatrix} \cdot R_{cmp} \quad (8)$$

where, $\hat{S}_{cfo}$ represents a decoded signal that is obtained by using the sent signal ($H_{wt} \cdot S$) that is impaired by the frequency offset as the decoding target, and $H_{wt}$ represents the parameter matrix of the frequency offset introduced at the sending end due to the LO difference; $\hat{S}$ represents estimation of S, that is, an estimated vector of the transmitted signal; $\omega_{sn}$ represents a CFO on an $n^{th}$ channel of transmitting ODU, H' represents approximation of an inverse matrix of H, and $R_{cmp}$ represents the vector of the received signal after the frequency offset of the receiving end is compensated; $h_{11}'$ and $h_{21}'$ represent two elements of H' respectively, and correspond to inverse mappings of a first channel of received signal and a second channel of received signal, where the inverse mappings are relative to a first channel of transmitted signal s1; $h_{12}'$ and $h_{22}'$ represent two elements of H' respectively, and correspond to inverse mappings of the first channel of received signal and the second channel of received signal, where the inverse mappings are relative to a second channel of transmitted signal s2; and $R_{cmp}$ represents the vector of the received signal after the frequency offset of the receiving end is compensated.

In terms of a mathematical model, a decoding model is an inverse mapping of a transmission system.

Finally, the decoded signal $\hat{S}_{cfo}$ is compensated by using an estimated frequency offset of the sending end, that is, a second estimated frequency offset value of the sending end to obtain a final decoded signal, as shown in formula (9):

$$\hat{S} = \begin{bmatrix} e^{-j\omega'_{s1}t} & 0 \\ 0 & e^{-j\omega'_{s2}t} \end{bmatrix} \cdot \hat{S}_{cfo} = H_{w't} \cdot \hat{S}_{cfo} = H_{w't} \cdot H_{wt} \cdot \hat{S} \quad (9)$$

where, $\hat{S}$ represents estimation of S, that is, the estimated vector of the transmitted signal; $\hat{S}_{cfo}$ represents the decoded signal that is obtained by using the sent signal ($H_{wt} \cdot S$) that is impaired by the frequency offset as the decoding target, and $\omega_{s'n}$ represents an estimated CFO of the $n^{th}$ channel of transmitting ODU; and $H_{w't}$ represents a parameter matrix for estimating the frequency offset of the sending end, $H_{wt}$ represents the parameter matrix of the frequency offset introduced at the sending end due to the LO difference, and $\hat{S}$ represents estimation of S, that is, the estimated vector of the transmitted signal.

In an optimal case, a decoded signal that is obtained through decoding is a sent signal. An error may occur during decoding when existence of an undesirable factor such as noise in the system is considered. Therefore, the decoded signal is actually estimation and approximation of the sent signal, that is, Ŝ.

In this case, a final convergence state of the decoding system is H', as shown in formula (8), which is not affected by a time-varying component, thereby implementing compensation at the receiving end for all frequency offsets of the receiving end and the sending end, where the frequency offsets of the receiving end and the sending end are distributed CFOs.

In this embodiment, n first estimated frequency offset values, that is, estimated frequency offset values of a receiving end, are acquired according to n center tap coefficients that correspond to n channels of first corrected signals and n first output phases that correspond to the n channels of first corrected signals; and a second estimated frequency offset value of a sending end is acquired according to a second output phase that corresponds to a superposed signal. That is, an estimated frequency offset does not need to be calculated by using a method that a known sequence is inserted in transmission data of a baseband signal, but an estimated frequency offset of each of the receiving end and the sending end may be acquired according to the transmission data of the baseband signal, that is, a first corrected signal, and then frequency offset correction is performed, according to the estimated frequency offset of the receiving end and the estimated frequency offset of the sending end, on n channels of second signals currently received, thereby ensuring effective transmission of data.

In addition, in this embodiment, a frequency offset is estimated according to the transmission data of the baseband signal and a transmission process of the transmission data is successive, therefore the method described in this embodiment has a dynamic tracing feature; a process of calculating the estimated frequency offset of the receiving end and the estimated frequency offset of the sending end does not involve high-dimensional matrix calculation, thereby reducing operation complexity; in this embodiment, frequency offsets of the two ends: the receiving end and the sending end, may be compensated at the receiving end, and compared with the prior art in which a frequency offset of a sending end is compensated at the sending end in a feedback manner, complexity of a compensation system is reduced and system construction and configuration are simplified; and the frequency offset is estimated and corrected by using a signal processing technology, so that a restriction and selection cost of a hardware device are reduced.

Embodiment 4

This embodiment provides a computer program product, where the computer program product includes computer program codes. When a computer unit performs the computer program codes, the computer unit performs actions described in Embodiment 1, Embodiment 2, or Embodiment 3. For details, reference may be made to the relevant description in Embodiment 1, Embodiment 2, or Embodiment 3, which are not described here again.

Embodiment 5

Figure 6:
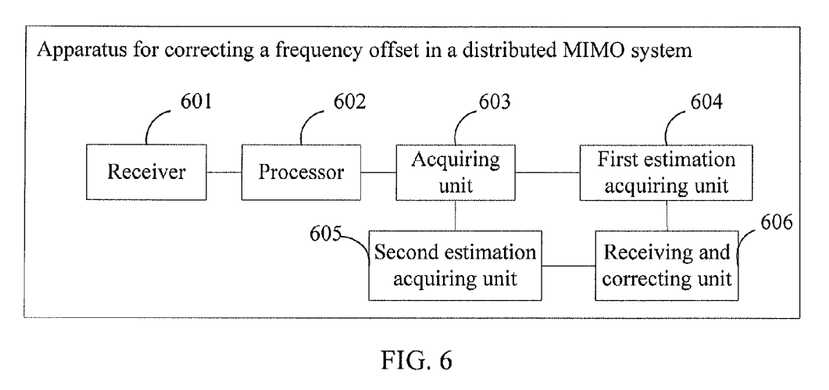
FIG. 6 is a first schematic structural diagram of an embodiment of an apparatus for correcting a frequency offset in a distributed MIMO system according to Embodiment 5 of the present disclosure.

Refer to FIG. 6, which is a first schematic structural diagram of an embodiment of an apparatus for correcting a frequency offset in a distributed MIMO system according to Embodiment 5 of the present disclosure.

The apparatus for correcting a frequency offset in the distributed MIMO system includes:
a receiver 601, configured to receive n channels of first signals, where n is a positive integer;
a processor 602, configured to perform frequency offset correction processing on the n channels of first signals to obtain n channels of first corrected signals;
an acquiring unit 603, configured to acquire n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, where the superposed signal is a signal that is obtained after the n channels of first corrected signals are superposed one by one;
a first estimation acquiring unit 604, configured to acquire n first estimated frequency offset values according to the n center tap coefficients and the n first output phases;
a second estimation acquiring unit 605, configured to acquire a second estimated frequency offset value according to the second output phase; and
a receiving and correcting unit 606, configured to receive n channels of second signals, and perform frequency offset correction on the n channels of second signals according to the n first estimated frequency offset values and the second estimated frequency offset value.

Figure 7:
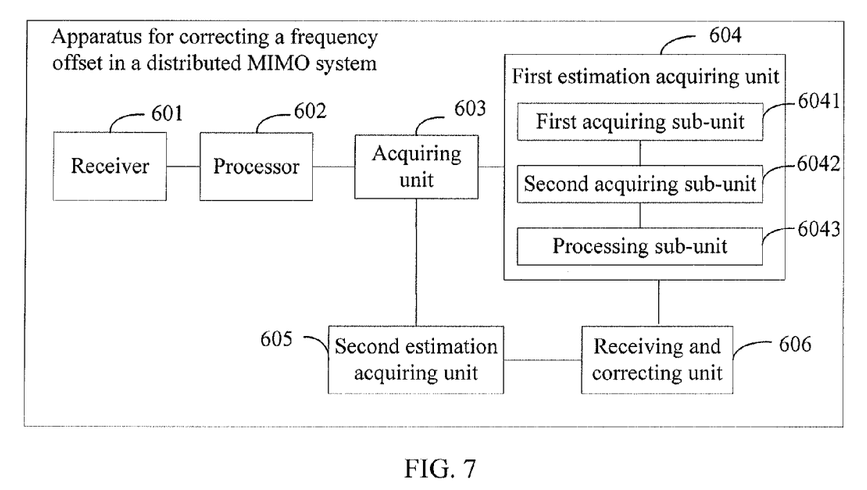
FIG. 7 is a second schematic structural diagram of the embodiment of the apparatus for correcting a frequency offset in the distributed MIMO system according to Embodiment 5 of the present disclosure.

In one implementation manner, the first estimation acquiring unit 604 includes: a first acquiring sub-unit 6041, a second acquiring sub-unit 6042, and a processing sub-unit 6043. As shown in FIG. 7, FIG. 7 is a second schematic structural diagram of the embodiment of the apparatus for correcting a frequency offset in the distributed MIMO system according to Embodiment 5 of the present disclosure.

The first acquiring sub-unit 6041 is configured to acquire n first estimated sub frequency offsets according to the n center tap coefficients.

The second acquiring sub-unit 6042 is configured to acquire n second estimated sub frequency offsets according to the n first output phases.

The processing sub-unit 6043 is configured to perform gain control and superposition and combination processing on the n first estimated sub frequency offsets and their corresponding n second estimated sub frequency offsets to obtain n first estimated frequency offset values.

The first acquiring sub-unit 6041 includes:
a phase extracting sub-unit, configured to extract instantaneous phase information of each of the n center tap coefficients to obtain n pieces of instantaneous phase information;
a first differentiation sub-unit, configured to perform a differential operation on each of the n pieces of instantaneous phase information to obtain n pieces of first frequency information;
an amplitude limiting sub-unit, configured to perform amplitude limiting processing on each of the n pieces of first frequency information to obtain n pieces of first amplitude-limited frequency information; and
a first low-pass filtering sub-unit, configured to perform low-pass filtering processing on each of the n pieces of first amplitude-limited frequency information to obtain n first estimated sub frequency offsets.

The second acquiring sub-unit 6042 includes:

a second differentiation sub-unit, configured to perform a differential operation on each of the n first output phases to obtain n pieces of second frequency information; and a second low-pass filtering sub-unit, configured to perform low-pass filtering processing on each of the n pieces of second frequency information to obtain n second estimated sub frequency offsets.

On the basis of the foregoing implementation manner, the second estimation acquiring unit 605 includes:

a third differentiation sub-unit, configured to perform a differential operation on the second output phase to obtain third frequency information; and a third low-pass filtering sub-unit, configured to perform low-pass filtering processing on the third frequency information to obtain a second estimated frequency offset value.

On the basis of the foregoing implementation manner, the receiving and correcting unit 606 includes:

a third acquiring sub-unit, configured to: when a decoding operation is a linear operation, perform gain control processing on the second estimated frequency offset value, and combine the second estimated frequency offset value that has undergone the gain control processing with the n first estimated frequency offset values to obtain n third estimated frequency offset values that correspond to the n channels of first signals; and a first determination and correcting sub-unit, configured to perform preprocessing on each of the n third estimated frequency offset values; determine whether each of n third preprocessed estimated frequency offset values converges, and if yes, perform an integral operation on each of the n third preprocessed estimated frequency offset values to obtain n pieces of estimated phase information; and perform, according to the n pieces of estimated phase information, phase modulation on the n channels of second signals to obtain a signal without a frequency offset.

The first determination and correcting sub-unit includes:

a weighting sub-unit, configured to multiply each of the n third estimated frequency offset values by a preset step to obtain n fourth estimated frequency offset values;

an iteration sub-unit, configured to perform iteration on the n fourth estimated frequency offset values and n corresponding locally-stored fifth estimated frequency offset values to obtain n third iterated estimated frequency offset values; and a determination sub-unit, configured to determine whether each of the n fourth estimated frequency offset values is less than or equal to a preset threshold, where if each of the n fourth estimated frequency offset values is less than or equal to the preset threshold, it indicates that the n third iterated estimated frequency offset values converge; and if each of the n fourth estimated frequency offset values is greater than the preset threshold, it indicates that the n third iterated estimated frequency offset values do not converge.

In another implementation manner, the apparatus further includes:

an updating unit, configured to: after the n third iterated estimated frequency offset values are obtained, update each of the n corresponding locally-stored fifth estimated frequency offset values according to the n third iterated estimated frequency offset values.

In another implementation manner, the receiving and correcting unit 606 includes:

a second determination and correcting sub-unit, configured to: when a decoding operation is not a linear operation, perform preprocessing on each of the n first estimated frequency offset values; determine whether each of n first preprocessed estimated frequency offset values converges, and if yes, perform frequency offset correction on each of the n channels of second signals according to the n first preprocessed estimated frequency offset values to obtain a first corrected signal; and perform frequency offset correction on a first decoding-processed corrected signal according to the second estimated frequency offset value to obtain a signal without a frequency offset.

In this embodiment, the apparatus for correcting a frequency offset in the distributed MIMO system may further include: a storage, configured to store at least one kind of the following information: values such as the n first estimated frequency offset values, the second estimated frequency offset value, the n first estimated sub frequency offsets, the n second estimated sub frequency offsets, the n fourth estimated frequency offset values, and the fifth estimated frequency offset value, which are not limited here and are not described here again.

In this embodiment, the apparatus for correcting a frequency offset in the distributed MIMO system is located in a baseband processing system, and the baseband processing system further includes n space time equalizers and (n+1) phase-locked loop phase detectors.

Figure 8:
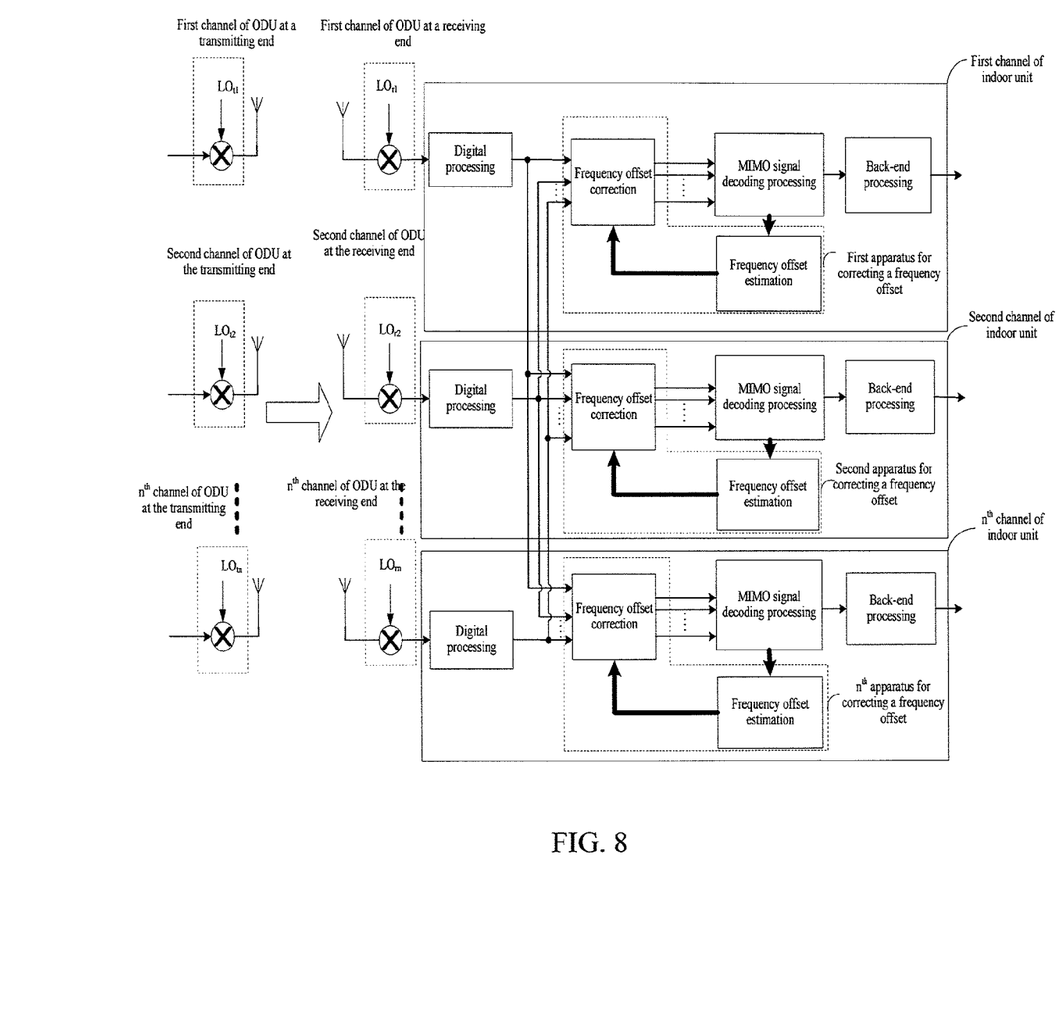
FIG. 8 is a schematic diagram of signal processing in a microwave MIMO system according to Embodiment 5 of the present disclosure.

Microwave MIMO is taken as an example for description in the following. Refer to FIG. 8, which is a schematic diagram of signal processing in a microwave MIMO system according to Embodiment 5 of the present disclosure.

The microwave MIMO system is a distributed MIMO system. n channels of baseband signals are transmitted to n channels of ODUs at a receiving end through the n channels of ODUs at a sending end, the n channels of ODUs at the receiving end transmits the n channels of baseband signals to n channels of baseband processing systems after receiving the n channels of baseband signals, and the n channels of baseband processing systems process the n channels of baseband signals. Because each ODU at the sending end and each ODU at the receiving end adopt an independent LO, the n channels of baseband signals received by the n channels of baseband processing systems have frequency offsets of the sending end and the receiving end.

A baseband processing system performs digital front-end processing such as analog-to-digital conversion and filtering on a received baseband signal, and an apparatus for correcting a frequency offset processes a digital signal that is obtained after digital processing. The apparatus for correcting a frequency offset may perform frequency offset estimation according to a center tap coefficient and an output phase that are acquired from a space time equalizer and a phase-locked loop phase detector, respectively; then perform frequency offset correction processing on the received digital signal according to an estimated value of a frequency offset to output a corrected signal to a subsequent space time equalizer and phase-locked loop phase detector for MIMO signal decoding processing to output a decoded signal; and then perform back-end processing such as combination and decision on the decoded signal to obtain a single channel of decoded signal finally.

In this embodiment, in a distributed MIMO system an apparatus for correcting a frequency offset acquires n first estimated frequency offset values, that is, estimated frequency offset values of a receiving end, according to n center tap coefficients that correspond to n channels of first corrected signals and n first output phases that correspond to the n channels of first corrected signals; and acquires a second estimated frequency offset value of a sending end according to a second output phase that corresponds to a superposed signal. That is, an estimated frequency offset does not need to be calculated by using a method that a known sequence is inserted in transmission data of a baseband signal, but an estimated frequency offset of each of the receiving end and the sending end may be acquired according to the transmission data of the baseband signal, that is, a first corrected signal, and then frequency offset correction is performed, according to the estimated frequency offset of the receiving end and the estimated frequency offset of the sending end, on n channels of second signals currently received, thereby ensuring effective transmission of data.

In addition, in this embodiment, a frequency offset is estimated according to the transmission data of the baseband signal and a transmission process of the transmission data is successive, therefore the method described in this embodiment has a dynamic tracing feature; a process of calculating the estimated frequency offset of the receiving end and the estimated frequency offset of the sending end does not involve high-dimensional matrix calculation, thereby reducing operation complexity; in this embodiment, frequency offsets of the two ends: the receiving end and the sending end, may be compensated at the receiving end, and compared with the prior art in which a frequency offset of a sending end is compensated at the sending end in a feedback manner, complexity of a compensation system is reduced and system construction and configuration are simplified; and the frequency offset is estimated and corrected by using a signal processing technology, so that a restriction and a selection cost of a hardware device are reduced.

It should be noted that, each embodiment in the present specification is described in a progressive manner, with each embodiment emphasizing its differences from other embodiments, and for the same or similar parts, reference may be made among the embodiments. The apparatus embodiment is basically the same as the method embodiment, and is therefore described briefly. For the relevant parts in the apparatus embodiment, reference may be made to the corresponding description in the method embodiment.

It should be noted that the relational terms here such as first and second are used only to differentiate an entity or operation from another entity or operation, and do not need or imply any actual relationship or sequence between these entities or operations. Moreover, the terms "include", "comprise", and any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . ." does not exclude other same elements existing in the process, the method, the object, or the device which includes the element.

Persons of ordinary skill in the art should understand that all or part of the steps of the foregoing embodiments may be implemented through hardware, and may also be implemented by a program instructing relevant hardware. The program may be stored in a computer readable storage medium. The storage medium may be a read-only memory, a magnetic disk, or an optical disk.

The foregoing descriptions are merely exemplary embodiments of the present disclosure, but are not intended to limit the present disclosure. Any modification, equivalent replacement or improvement derived within the principle of the present disclosure shall all fall within the protection scope of the present disclosure.

What is claimed is:

1. A method for correcting a frequency offset in a distributed multiple input multiple output (MIMO) system, comprising:
    receiving n channels of first signals, wherein n is a positive integer;
    performing frequency offset correction processing on the n channels of first signals to obtain n channels of first corrected signals;
    acquiring n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, wherein the superposed signal is a signal that is obtained after the n channels of first corrected signals are superposed one by one;
    acquiring n first estimated frequency offset values according to the n center tap coefficients and the n first output phases;
    acquiring a second estimated frequency offset value according to the second output phase; and
    receiving n channels of second signals, and performing frequency offset correction on the n channels of second signals according to the n first estimated frequency offset values and the second estimated frequency offset value;
    wherein acquiring n first estimated frequency offset values according to the n center tap coefficients and the n first output phases comprises:
    acquiring n first estimated sub frequency offsets according to the n center tap coefficients;
    acquiring n second estimated sub frequency offsets according to the n first output phases; and
    performing gain control and superposition and combination processing on the n first estimated sub frequency offsets and n second estimated sub frequency offsets corresponding to the n first estimated sub frequency offsets to obtain n first estimated frequency offset values.

2. The method according to claim 1, wherein acquiring n first estimated sub frequency offsets according to the n center tap coefficients comprises:
    extracting instantaneous phase information of each of the n center tap coefficients to obtain n pieces of instantaneous phase information;
    performing a differential operation on each of the n pieces of instantaneous phase information to obtain n pieces of first frequency information;
    performing amplitude limiting processing on each of the n pieces of first frequency information to obtain n pieces of first amplitude-limited frequency information; and
    performing low-pass filtering processing on each of the n pieces of first amplitude-limited frequency information to obtain n first estimated sub frequency offsets.

3. The method according to claim 1, wherein acquiring n second estimated sub frequency offsets according to the n first output phases comprises:
    performing a differential operation on each of the n first output phases to obtain n pieces of second frequency information; and performing low-pass filtering processing on each of the n pieces of second frequency information to obtain n second estimated sub frequency offsets.

4. The method according to claim 1, wherein acquiring a second estimated frequency offset value according to the second output phase comprises:
performing a differential operation on the second output phase to obtain third frequency information; and
performing low-pass filtering processing on the third frequency information to obtain a second estimated frequency offset value.

5. The method according to claim 1, wherein performing frequency offset correction on the n channels of second signals according to the n first estimated frequency offset values and the second estimated frequency offset value comprises:
when a decoding operation is a linear operation, performing gain control processing on the second estimated frequency offset value, and combining the second estimated frequency offset value that has undergone the gain control processing with the n first estimated frequency offset values to obtain n third estimated frequency offset values that correspond to the n channels of first signals; and
performing preprocessing on each of the n third estimated frequency offset values; determining whether each of n third preprocessed estimated frequency offset values converges, and when yes, performing an integral operation on each of the n third preprocessed estimated frequency offset values to obtain n pieces of estimated phase information; and
performing, according to the n pieces of estimated phase information, phase modulation on the n channels of second signals to obtain a signal without a frequency offset.

6. The method according to claim 1, wherein performing frequency offset correction on the n channels of second signals according to the n first estimated frequency offset values and the second estimated frequency offset value comprises:
when a decoding operation is not a linear operation, performing preprocessing on each of the n first estimated frequency offset values; determining whether each of n first preprocessed estimated frequency offset values converges, and when yes, performing frequency offset correction on each of the n channels of second signals according to the n first preprocessed estimated frequency offset values to obtain a first corrected signal; and performing frequency offset correction on a first decoding-processed corrected signal according to the second estimated frequency offset value to obtain a signal without a frequency offset.

7. The method according to claim 5, wherein performing preprocessing on each of the n third estimated frequency offset values comprises:
multiplying each of the n third estimated frequency offset values by a preset step to obtain n fourth estimated frequency offset values; and
performing iteration on the n fourth estimated frequency offset values and n corresponding locally-stored fifth estimated frequency offset values to obtain n third iterated estimated frequency offset values; and wherein,
determining whether each of n third preprocessed estimated frequency offset values converges comprises:
determining whether each of the n fourth estimated frequency offset values is less than or equal to a preset threshold, wherein if each of the n fourth estimated frequency offset values is less than or equal to the preset threshold, it indicates that the n third iterated estimated frequency offset values converge; and if each of the n fourth estimated frequency offset values is greater than the preset threshold, it indicates that the n third iterated estimated frequency offset values do not converge.

8. A non-transitory storage medium storing a set of instructions, the set of instructions to direct a processor to perform acts of:
receiving n channels of first signals, wherein n is a positive integer;
performing frequency offset correction processing on the n channels of first signals to obtain n channels of first corrected signals;
acquiring n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, wherein the superposed signal is a signal that is obtained after the n channels of first corrected signals are superposed one by one;
acquiring n first estimated frequency offset values according to the n center tap coefficients and the n first output phases;
acquiring a second estimated frequency offset value according to the second output phase; and
receiving n channels of second signals, and performing frequency offset correction on the n channels of second signals according to the n first estimated frequency offset values and the second estimated frequency offset value;
wherein acquiring n first estimated frequency offset values according to the n center tap coefficients and the n first output phases comprises:
acquiring n first estimated sub frequency offsets according to the n center tap coefficients;
acquiring n second estimated sub frequency offsets according to the n first output phases; and
performing gain control and superposition and combination processing on the n first estimated sub frequency offsets and n second estimated sub frequency offsets corresponding to the n first estimated sub frequency offsets to obtain n first estimated frequency offset values.

9. An apparatus for correcting a frequency offset in a distributed multiple input multiple output (MIMO) system, comprising:
a receiver, configured to receive n channels of first signals, wherein n is a positive integer;
a processor, configured to perform frequency offset correction processing on the n channels of first signals to obtain n channels of first corrected signals;
an acquiring unit, configured to acquire n center tap coefficients of a space time equalizer that corresponds to the n channels of first corrected signals, n first output phases of a phase-locked loop phase detector that corresponds to the n channels of first corrected signals, and a second output phase of a phase-locked loop phase detector that corresponds to a superposed signal, wherein the superposed signal is a signal that is obtained after the n channels of first corrected signals are superposed one by one;
a first estimation acquiring unit, configured to acquire n first estimated frequency offset values according to the n center tap coefficients and the n first output phases;
a second estimation acquiring unit, configured to acquire a second estimated frequency offset value according to the second output phase; and a receiving and correcting unit, configured to receive n channels of second signals, and perform frequency offset correction on the n channels of second signals according to the n first estimated frequency offset values and the second estimated frequency offset value;

wherein the first estimation acquiring unit comprises:

a first acquiring sub-unit, configured to acquire n first estimated sub frequency offsets according to the n center tap coefficients;

a second acquiring sub-unit, configured to acquire n second estimated sub frequency offsets according to the n first output phases; and a processing sub-unit, configured to perform gain control and superposition and combination processing on the n first estimated sub frequency offsets and n second estimated sub frequency offsets corresponding to the n first estimated sub frequency offsets to obtain n first estimated frequency offset values.

10. The apparatus according to claim 9, wherein the first acquiring sub-unit comprises:

a phase extracting sub-unit, configured to extract instantaneous phase information of each of the n center tap coefficients to obtain n pieces of instantaneous phase information;

a first differentiation sub-unit, configured to perform a differential operation on each of the n pieces of instantaneous phase information to obtain n pieces of first frequency information;

an amplitude limiting sub-unit, configured to perform amplitude limiting processing on each of the n pieces of first frequency information to obtain n pieces of first amplitude-limited frequency information; and a first low-pass filtering sub-unit, configured to perform low-pass filtering processing on each of the n pieces of first amplitude-limited frequency information to obtain n first estimated sub frequency offsets.

11. The apparatus according to claim 9, wherein the second acquiring sub-unit comprises:

a second differentiation sub-unit, configured to perform a differential operation on each of the n first output phases to obtain n pieces of second frequency information; and a second low-pass filtering sub-unit, configured to perform low-pass filtering processing on each of the n pieces of second frequency information to obtain n second estimated sub frequency offsets.

12. The apparatus according to claim 9, wherein the second estimation acquiring unit comprises:

a third differentiation sub-unit, configured to perform a differential operation on the second output phase to obtain third frequency information; and a third low-pass filtering sub-unit, configured to perform low-pass filtering processing on the third frequency information to obtain a second estimated frequency offset value.

13. The apparatus according to claim 9, wherein the receiving and correcting unit comprises:

a third acquiring sub-unit, configured to: when a decoding operation is a linear operation, perform gain control processing on the second estimated frequency offset value, and combine the second estimated frequency offset value that has undergone the gain control processing with the n first estimated frequency offset values to obtain n third estimated frequency offset values that correspond to the n channels of first signals; and a first determination and correcting sub-unit, configured to perform preprocessing on each of the n third estimated frequency offset values; determine whether each of n third preprocessed estimated frequency offset values converges, and when yes, perform an integral operation on each of the n third preprocessed estimated frequency offset values to obtain n pieces of estimated phase information; and perform, according to the n pieces of estimated phase information, phase modulation on the n channels of second signals to obtain a signal without a frequency offset.

14. The apparatus according to claim 9, wherein the receiving and correcting unit comprises:

a second determination and correcting sub-unit, configured to: when a decoding operation is not a linear operation, perform preprocessing on each of the n first estimated frequency offset values; determine whether each of n first preprocessed estimated frequency offset values converges, and when yes, perform frequency offset correction on each of the n channels of second signals according to the n first preprocessed estimated frequency offset values to obtain a first corrected signal; and perform frequency offset correction on a first decoding-processed corrected signal according to the second estimated frequency offset value to obtain a signal without a frequency offset.

15. The apparatus according to claim 13, wherein the first determination and correcting sub-unit comprises:

a weighting sub-unit, configured to multiply each of the n third estimated frequency offset values by a preset step to obtain n fourth estimated frequency offset values;

an iteration sub-unit, configured to perform iteration on the n fourth estimated frequency offset values and n corresponding locally-stored fifth estimated frequency offset values to obtain n third iterated estimated frequency offset values; and a determination sub-unit, configured to determine whether each of the n fourth estimated frequency offset values is less than or equal to a preset threshold, wherein if each of the n fourth estimated frequency offset values is less than or equal to the preset threshold, it indicates that the n third iterated estimated frequency offset values converge; and if each of the n fourth estimated frequency offset values is greater than the preset threshold, it indicates that the n third iterated estimated frequency offset values do not converge.

* * * * *